April 16, 1940.  A. N. LAWRENCE  2,197,554
LIQUID CONTROL GEAR
Filed July 31, 1937  2 Sheets-Sheet 1
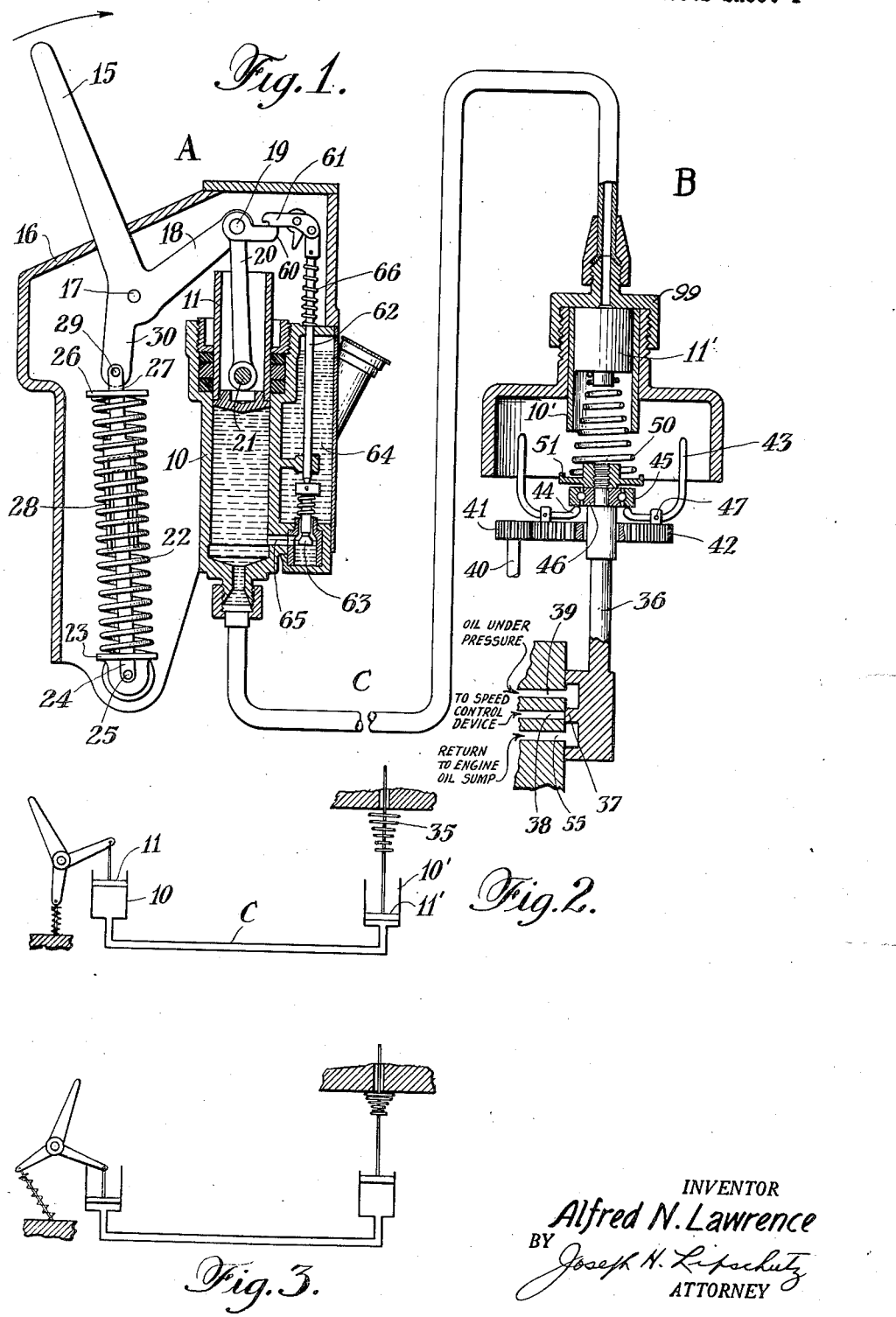

April 16, 1940.　　A. N. LAWRENCE　　2,197,554
LIQUID CONTROL GEAR
Filed July 31, 1937　　2 Sheets-Sheet 2

INVENTOR
Alfred N. Lawrence
BY
Joseph H. Lipschutz
ATTORNEY

Patented Apr. 16, 1940

2,197,554

UNITED STATES PATENT OFFICE 2,197,554

LIQUID CONTROL GEAR

Alfred N. Lawrence, New York, N. Y., assignor to Sperry Products, Inc., Brooklyn, N. Y., a corporation of New York Application July 31, 1937, Serial No. 156,630

5 Claims. (Cl. 60—54.5)

This invention relates to liquid control gear of the type wherein movement of a member at a transmitting station is caused to control movement of a member at a receiving station. More particularly, this invention relates to control gear of this type wherein the transmitting and receiving stations are connected by a liquid transmission system. One such system is shown and described in the U. S. patent to H. S. Hele-Shaw and T. E. Beacham, No. 1,983,884, granted December 11, 1934. Said patent discloses a liquid control gear of the type described, employing a liquid transmission system. The object in the said patent is to apply a constant force to the fluid system at the transmitting end and to receive a correspondingly constant force at the receiving end, whereby the operating and operated members will retain any position into which they may be moved without any tendency on their part to return to a centralized position as would be the case if the transmitting member operated in a manner so as to apply an increasing load. It sometimes happens, however, in certain systems where force is to be transmitted to a distance, that a constantly increasing load is to be overcome at the operated or receiving end, in which case it would not be desirable to transmit a constant force since the increasing load at the receiving end would tend to return the transmitting element to its original position and would not result in maintaining the operated member in the desired position.

It is therefore the principal object of my invention to provide a transmission system wherein a constantly increasing force may be transmitted at the transmitting end as the operating member is moved in a given direction in order that a constantly increasing resisting force at the receiving end may be counterbalanced, whereby the parts will remain in whatever position they are actuated.

Further objects and advantages of this invention will become apparent in the following detailed description thereof.

In the accompanying drawings,

Fig. 1 is an assembly view, with parts sectioned vertically, of a liquid control gear embodying my invention.

Figs. 2 and 3 are diagrammatic views illustrating the principle of operation of this invention.

Figure 4:
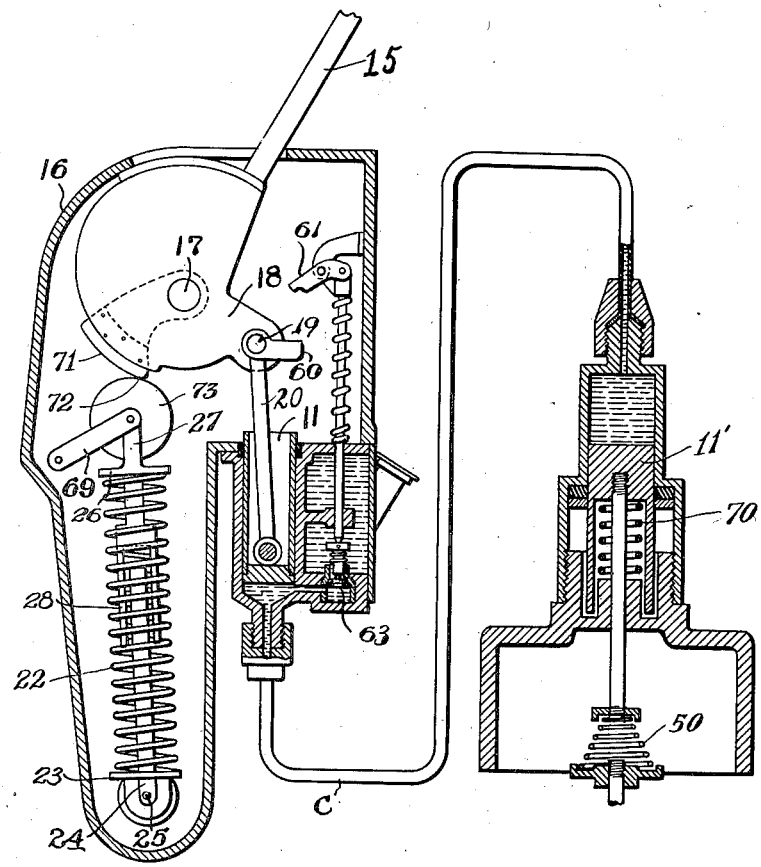
Fig. 4 is a view similar to Fig. 1 but showing a modified form of the invention.

Referring to the drawings, it will be seen that this invention comprises three main parts, namely, a transmitter A, a receiving station B, and a force transferring means, such as a connecting duct C adapted to be filled with a liquid. It will be apparent that force supplied at one end of the liquid column will cause said column to move through the duct C to operate a member at the other end of the liquid column. For applying forces to the liquid column for the purpose of transmitting forces, there may be provided a cylinder 10 within which operates a trunk type piston 11. Said cylinder is connected at one end to the duct C which is filled with liquid extending up to the said piston. For operating the said piston in a direction to transmit force to the liquid column, there may be provided an operating handle 15 pivoted in casing 16 at 17, said lever having a crank arm 18 pivotally connected at 19 to the upper end of a piston rod 20 pivotally connected to the piston at 21. As the handle is moved in the direction of the arrow, the piston is lowered to cause the column of liquid to move through the duct C. The force which is applied to the piston is determined by a loading spring 22 seated against a bracket 23 fixed upon a rod 24 pivoted at 25 within the casing 16. The other end of said loading spring bears against a bracket 26 fixed to a member 27 having a sleeve 28 within which rod 24 may slide, so that said spring is extensible. The member 27 is pivoted at 29 to a crank arm 30 integral with the crank arm 18 and handle 15. The position of the spring and its connections is such that the spring acts through a small lever arm to apply a very slight loading force to crank arm 18 and the piston 11 when the piston is in its uppermost position, but as the handle 15 is actuated in the direction of the arrow it will be seen that the spring acts through an increasing lever arm. At the same time, however, the spring is extended so that while it acts through a larger lever arm it applies a decreasing force as said arm increases. However, the design of the various parts is such that the rate of decrease of the compressive force of the spring is slower than the rate of increase of the lever arm as handle 15 is actuated in the direction of the arrow, so that the force applied to the piston 11, which is the product of these two factors, will increase at a constant rate to apply a constantly increasing loading force on the piston as it moves into its cylinder 10. The force which an operator applies to handle 15 is constant in spite of the increasing force on the piston, and is only sufficient to overcome friction in the system.

The advantage of a system such as that described above wherein actuation of a transmitter serves to transmit a constantly increasing force is apparent in the diagrammatic Figs. 2 and 3. In these figures it will be seen that as piston 11 moves into its cylinder 10, it is caused to operate a piston 11' in an opposite direction, that is, out of its cylinder 10'. As said piston moves outwardly it meets increasing resistance from a restoring spring 35. In other words, this is a simplified illustration of the many applications wherein an operated member such as the piston 11' must do an increasing amount of work the further it is operated. One such application is illustrated in the drawings and is for the purpose of controlling a fly ball governor which in turn controls the pitch of the propeller blades of an airplane propeller in order to enable the airplane engine to operate at its maximum efficient speed. Thus, in the example shown in Fig. 1, if it is desired to vary the pitch of the propellers, handle 15 is operated in the direction of the arrow, which will cause piston 11' to be moved out of its cylinder and carry therewith a valve stem 36. As said valve stem 36 is moved downwardly (in Fig. 1) valve 37 opens the port 38 to connect the same with a source of oil under pressure, 39. The said port 38 leads to a propeller pitch control device to cause the blades of said propeller to be changed in position in a direction to permit the engine to run at higher speed. As the engine speed picks up in response to the said change in pitch of the propeller, the valve stem 36 is caused to be moved upwardly to close port 38 and retain the propeller blades in the predetermined position. For this purpose, the engine may drive through shaft 40 and suitable gearing 41, 42 to operate a governor 43 carried by the gear 42, one end 44 of each governor element being in engagement with a race 45 around a collar 46 fixed to the valve stem 36. As the speed of the engine picks up, the governor elements will rotate around their pivots 47 to lift the valve stem against the action of spring 50. Said spring at one end engages a disk 51 fixed to the valve member 36 and at the other end presses against the piston 11'. When the speed of the engine has picked up sufficiently to lift the valve stem 36 so as to close port 38, then the pressure which the spring 50 applies to piston 11' will be equal to the force transmitted to the other end of said piston 11' by the piston 11. If the speed of the engine exceeds the desired speed, then the valve stem 36 will be further lifted to uncover port 38 and connect the same with the return passage 55 to permit some of the oil to drain out and thus shift the propeller blades in the opposite direction to cut down the speed. When the engine speed is at the desired point the opposing force upon one side of said piston 11' will equal the transmitted force on the other side thereof.

Since in every liquid transmission system of the type described a certain amount of the liquid will leak past the pistons, and since the accuracy of operation of the system depends upon constancy of volume of liquid in the transmission system, means must be provided for periodically replenishing the fluid in the system to make good any loss or to permit withdrawal of an excess due to temperature expansion, etc. For this purpose, applicant has shown the system which is fully shown and described in the said patent to Hele-Shaw No. 1,983,884 and which consists of an arm 60 carried by the piston rod 20, designed, each time the operating lever is moved to its limiting position, to actuate trip mechanism 61 to lift a valve stem 62 to open a valve 63 to permit fluid from an auxiliary reservoir 64 to communicate with the fluid in the transmission system through a passage 65. If there is a deficiency of fluid in the transmission system, fluid will be supplied from reservoir 64. The valve 63 is normally maintained seated by means of a spring 66.

In Fig. 4 there is disclosed a modified form of this invention which is particularly adapted for use in transmission systems wherein it is necessary to employ a connecting duct or tube C of such small bore that the friction losses in the pipe are relatively high. In such a system, upon the return of handle 15 in a direction opposite to that shown by the arrow, that is, in a direction toward unactuated position, the spring 50 would not be capable of overcoming the frictional losses in the duct C rapidly enough to prevent breaking of the column of the fluid and hence rendering the device at lease temporarily inoperative. In such systems, therefore, additional spring loading means is essential at the receiving end in order that the fluid may be returned through the narrow orifice duct C rapidly enough to follow the return movements of the operating handle 15. For this purpose, the Fig. 1 form of the invention may be modified as shown in Fig. 4 by the addition of an auxiliary loading spring 70 operating against piston 11' together with the spring 50. When the handle 15 is in unactuated position the spring 70 is designed to have an initial compression pressure which is sufficient to overcome the frictional losses in the particular transmission duct C.

Since the entire system must always be balanced, it is necessary that the same pressure be maintained at all times at the transmission end A as at the receiving end B. Therefore, in the Fig. 4 form of the invention where there is an initial loading on the piston 11' due to the compression of spring 70, there must also be a similar loading of piston 11. This may be accomplished by varying the crank arm through which the spring 22 applies pressure to the piston 11 from that shown in Fig. 1 to the form shown in Fig. 4. Thus, in Fig. 1, in the unactuated position of handle 15 there is practically no lever arm through which the compression spring 22 may act. In other words, the initial loading on piston 11 is substantially zero. In the Fig. 4 form, however, the compression spring 22 acts through cam 71 and in the unactuated position of handle 15 point 72 is in engagement with a roller 73 at the upper end of stem 27, and in this position the lever arm through which the compression spring acts is such that the product of the spring force and the lever arm applies a pressure to the piston 11 equal and opposite to the pressure applied to piston 11'. The cam 71 is formed of increasing radius to move piston 11 downwardly as handle 15 is moved in a clock-wise direction (in Fig. 4) so that in each position of handle 15 the pressure on piston 11 is the same as that upon piston 11'. The upper end of stem 27 is guided by a link 69 pivoted to the stem and to the casing.

If desired, the spring 50 may be so designed that in the initial unactuated position of handle 15 the said spring 50 without the aid of an auxiliary spring has sufficient compression to apply the necessary initial force to the piston 11', and hence to the column of fluid, to overcome the frictional loss in the connecting duct. The device would then be the same as in the Fig. 1 form, except that spring 50 would have an initial compressive force and the spring 22 would act through the cam 71 of the Fig. 4 form.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A balanced remote control system comprising a transmitting station, a receiving station, a single-pipe fluid connection between said stations, means operatable at the transmitting station for transferring force through said connection, means at the receiving station adapted to offer increasing resistance the further said operatable means is actuated, and means whereby said operatable means transmits increasing force through said connection substantially equal to the increasing resistance at the receiving station the further said operatable means is actuated, said last-named means comprising an elastic source of energy, a direct mechanical linkage between said source of energy and said fluid connection, and a handle for operating said linkage whereby the force applied by said source of energy to said fluid connection may be varied.

2. A balanced remote control system comprising a transmitting station, a receiving station, a single-pipe fluid connection between said stations, means operatable at the transmitting station for transferring force through said connection, means at the receiving station adapted to offer increasing resistance the further said operatable means is actuated, and means whereby said operatable means transmits increasing force through said connection substantially equal to the increasing resistance at the receiving station the further said operatable means is actuated, said last-named means comprising an elastic source of energy, a direct mechanical linkage between said source of energy and said fluid connection, said linkage comprising a cam, and a handle for operating said cam whereby the force applied by said source of energy to said fluid connection may be varied.

3. A liquid remote control system comprising a transmitting station, a receiving station, a duct connecting said stations, a column of liquid extending through said duct, means operatable at the transmitting station for operating said column of liquid, means at the receiving station adapted to be operated by said column of liquid and to offer increasing resistance the further said operatable means is actuated, said last named means being adapted normally to apply a predetermined force to said column, and means at the transmitting station for normally applying a force to said column substantially equal to the force normally applied at the receiving station and for applying increasing force to said column the further said operatable means is actuated.

4. A liquid remote control system comprising a transmitting station, a receiving station, a duct connecting said stations, a column of liquid extending through said duct, means operatable at the transmitting station for operating said column of liquid, means at the receiving station adapted to be operated by said column of liquid and to offer increasing resistance the further said operatable means is actuated, said last named means being adapted normally to apply a predetermined force to said column sufficient to move said column through said duct at a predetermined rate, and means at the transmitting station for normally applying a force to said column substantially equal to the force normally applied at the receiving station and for applying increasing force to said column the further said operatable means is actuated.

5. A liquid remote control system comprising a transmitting station, a receiving station, a duct connecting said stations, a column of liquid extending through said duct, means operatable at the transmitting station for operating said column of liquid, means at the receiving station adapted to be operated by said column of liquid and to offer increasing resistance the further said operatable means is actuated, said last named means being adapted normally to apply a predetermined force to said column sufficient to move said column through said duct at a predetermined rate, and means at the transmitting station for normally applying a force to said column substantially equal to the force normally applied at the receiving station and for applying increasing force to said column substantially equal to the increasing resistance of said means at the receiving station the further said operatable means is actuated.

ALFRED N. LAWRENCE.